United States Patent
Phelps, Sr. et al.

(10) Patent No.: US 8,017,100 B2
(45) Date of Patent: Sep. 13, 2011

(54) CONVERSION OF UREA TO REACTANTS FOR $NO_x$ REDUCTION

(75) Inventors: Calvin E. Phelps, Sr., Akron, OH (US); Clayton A. Erickson, Princeton, MA (US); Rajaram Jambhekar, Randolph, MA (US); John R. Harold, Worcester, MA (US)

(73) Assignee: Babcock Power Environmental Inc., Worcester, MA (US)

( * ) Notice: Subject to any disclaimer, the term of this patent is extended or adjusted under 35 U.S.C. 154(b) by 78 days.

(21) Appl. No.: 12/567,864

(22) Filed: Sep. 28, 2009

(65) Prior Publication Data

US 2010/0015029 A1     Jan. 21, 2010

Related U.S. Application Data

(62) Division of application No. 11/801,705, filed on May 10, 2007.

(60) Provisional application No. 60/914,598, filed on Apr. 27, 2007.

(51) Int. Cl.
*C01C 1/08* (2006.01)

(52) U.S. Cl. ............. 423/358; 423/235; 423/DIG. 5; 422/105; 422/108

(58) Field of Classification Search ............ 423/235, 423/358, DIG. 5; 422/105, 108
See application file for complete search history.

(56) References Cited

U.S. PATENT DOCUMENTS

| | | | |
|---|---|---|---|
| 2,894,878 A | 7/1959 | Cook | |
| 3,488,293 A | 1/1970 | Hong et al. | |
| 3,758,572 A | 9/1973 | Jones, Jr. et al. | |
| 3,826,815 A | 7/1974 | Mavrovic | |
| 3,900,554 A | 8/1975 | Lyon | |
| 3,922,222 A | 11/1975 | Van Moorsel | |
| 4,038,372 A | 7/1977 | Colli | |
| 4,107,272 A | 8/1978 | Mori et al. | |
| 4,138,469 A | 2/1979 | Kato et al. | |
| 4,208,386 A | 6/1980 | Arand et al. | |
| 4,220,635 A | 9/1980 | Schell | |

(Continued)

FOREIGN PATENT DOCUMENTS

CA        1100292 A1     5/1981

(Continued)

OTHER PUBLICATIONS

International Search Report dated Jul. 21, 2008 for International Application No. PCT/US2008/061780.

(Continued)

*Primary Examiner* — Timothy Vanoy
(74) *Attorney, Agent, or Firm* — Edwards Angell Palmer & Dodge LLP; Joshua L. Jones

(57) ABSTRACT

The invention provides a system for converting urea into reactants useful for removing $NO_X$ from industrial emissions. The system includes a urea inlet, a steam inlet, and a reactor in fluid communication with the urea inlet and the steam inlet. The reactor is configured and adapted to inject urea from the urea inlet into a steam flow from the steam inlet to convert the urea into at least one reactant for $NO_X$ reduction within a substantially gaseous mixture. The invention also provides a method of converting urea into reactants for reducing $NO_X$ out of industrial emissions. The method includes injecting urea into a steam flow to convert the urea into at least one reactant for $NO_X$ reduction within a substantially gaseous mixture.

19 Claims, 3 Drawing Sheets

U.S. PATENT DOCUMENTS

| | | | |
|---|---|---|---|
| 4,268,488 | A | 5/1981 | Ginger |
| 4,325,924 | A | 4/1982 | Arand et al. |
| 4,393,031 | A | 7/1983 | Henke |
| 4,602,673 | A | 7/1986 | Michelfelder et al. |
| 4,652,678 | A | 3/1987 | Douwes |
| 4,678,643 | A | 7/1987 | Fetzer |
| 5,024,171 | A | 6/1991 | Krigmont et al. |
| 5,029,535 | A | 7/1991 | Krigmont et al. |
| 5,034,030 | A | 7/1991 | Miller et al. |
| 5,098,680 | A | 3/1992 | Fellows et al. |
| 5,104,629 | A | 4/1992 | Dreschler |
| 5,165,903 | A | 11/1992 | Hunt et al. |
| 5,240,688 | A | 8/1993 | von Harpe et al. |
| 5,252,298 | A | 10/1993 | Jones |
| 5,252,308 | A | 10/1993 | Young |
| 5,281,403 | A | 1/1994 | Jones |
| 5,282,355 | A | 2/1994 | Yamaguchi |
| 5,399,755 | A | 3/1995 | Lagana |
| 5,421,194 | A | 6/1995 | Doyle et al. |
| 5,489,419 | A | 2/1996 | Diep et al. |
| 5,543,123 | A | 8/1996 | Hofmann et al. |
| 5,547,650 | A | 8/1996 | Edgwar et al. |
| 5,555,718 | A | 9/1996 | Anderson et al. |
| 5,589,142 | A | 12/1996 | Gribbon |
| 5,681,536 | A | 10/1997 | Swoboda et al. |
| 5,827,490 | A | 10/1998 | Jones |
| 5,976,475 | A | 11/1999 | Peter-Hoblyn et al. |
| 5,985,224 | A | 11/1999 | Lagana |
| 6,077,491 | A | 6/2000 | Cooper et al. |
| 6,093,380 | A | 7/2000 | Lagana et al. |
| 6,203,770 | B1 | 3/2001 | Peter-Hoblyn et al. |
| 6,322,762 | B1 | 11/2001 | Cooper et al. |
| 6,403,046 | B1 | 6/2002 | Spokoyny |
| 6,436,359 | B1 | 8/2002 | Spencer, III et al. |
| 6,471,927 | B2 | 10/2002 | Hofmann et al. |
| 6,491,885 | B1 | 12/2002 | Tokunaga et al. |
| 6,506,350 | B2 | 1/2003 | Cooper et al. |
| 6,511,644 | B1 | 1/2003 | MacArthur et al. |
| 6,616,901 | B1 | 9/2003 | Lagana et al. |
| 6,730,280 | B2 | 5/2004 | Cooper et al. |
| 6,761,868 | B2 | 7/2004 | Brooks et al. |
| 6,887,449 | B2 | 5/2005 | Brooks et al. |
| 7,008,603 | B2 | 3/2006 | Brooks et al. |
| 7,090,810 | B2 | 8/2006 | Sun et al. |
| 7,220,395 | B2 | 5/2007 | Cooper et al. |
| 7,273,595 | B2 | 9/2007 | Spokoyny |
| 7,416,715 | B2 | 8/2008 | Spokoyny |
| 7,509,799 | B2 | 3/2009 | Amou et al. |
| 2002/0028170 | A1 | 3/2002 | Sudduth et al. |
| 2002/0148220 | A1 | 10/2002 | Patchett et al. |
| 2003/0014194 | A1 | 1/2003 | Fischer |
| 2003/0053943 | A1* | 3/2003 | Cooper et al. ............. 423/235 |
| 2003/0118494 | A1 | 6/2003 | Glesmann et al. |
| 2003/0211024 | A1 | 11/2003 | Wojichowski |
| 2004/0057887 | A1 | 3/2004 | Sun et al. |
| 2004/0197251 | A1 | 10/2004 | Williamson |
| 2005/0074383 | A1 | 4/2005 | Wojichowski |
| 2005/0207961 | A1 | 9/2005 | Brooks et al. |
| 2006/0115402 | A1 | 6/2006 | Sun et al. |
| 2006/0251554 | A1 | 11/2006 | Doucet et al. |
| 2006/0257303 | A1 | 11/2006 | Telford |
| 2006/0275192 | A1 | 12/2006 | Gabrielsson et al. |
| 2007/0048204 | A1 | 3/2007 | Mital |
| 2007/0119153 | A1 | 5/2007 | Pierz et al. |
| 2008/0050297 | A1 | 2/2008 | Harold et al. |
| 2008/0211118 | A1 | 9/2008 | Wyse et al. |
| 2008/0267837 | A1 | 10/2008 | Phelps et al. |
| 2008/0292511 | A1 | 11/2008 | Spokoyny |

FOREIGN PATENT DOCUMENTS

| | | |
|---|---|---|
| DE | 3800730 A1 | 8/1988 |
| DE | 4313861 A1 | 11/1994 |
| DE | 19720205 | 11/1998 |
| EP | 0199186 A1 | 10/1986 |
| EP | 0210392 A2 | 2/1987 |
| EP | 0487886 A1 | 6/1992 |
| WO | WO-98/42623 | 10/1998 |

OTHER PUBLICATIONS

Preliminary Report on Patentability dated Oct. 27, 2009 for International Application No. PCT/US2008/061780.

European Search Report for EP08769218, dated Mar. 10, 2010.

Canadian Office Action dated Jul. 13, 2011 issued on related Canadian Patent Application No. 2,685,555.

* cited by examiner

CONVERSION OF UREA TO REACTANTS FOR $NO_x$ REDUCTION

CROSS-REFERENCE TO RELATED APPLICATIONS

This application is a divisional of U.S. patent application Ser. No. 11/801,705, filed May 10, 2007, which claims priority to U.S. Provisional Patent Application No. 60/914,598, filed Apr. 27, 2007, each of which is incorporated by reference herein in its entirety.

BACKGROUND OF THE INVENTION

1. Field of the Invention

The present invention relates to a system for $NO_X$ reduction. Particularly, the present invention is directed to a system for converting urea into reactants for removing $NO_X$ from industrial emissions.

2. Description of Related Art

A variety of urea conversion devices are known in the art for converting urea into reactants, such as ammonia, which are useful in reducing $NO_X$ emissions in industrial settings. Of such devices, many are directed to systems that utilize hydrolysis to convert urea into ammonia and other reactants for $NO_X$ reduction.

Combustion of fossil fuels, such as in power plants and other industrial settings, leads to a release of pollutants. $NO_2$ and NO (referred to as $NO_X$) are particularly problematic pollutants arising from fossil fuel combustion. Great efforts have been applied to the reduction of $NO_X$ emissions. Selective Catalytic Reduction (SCR) is one process that has achieved relative success in $NO_X$ reduction. SCR reacts ammonia or other reactants with $NO_X$ in effluent gasses to reduce $NO_X$ into more environmentally friendly products. It is possible to reduce in excess of 90% of the $NO_X$ out of effluent gasses through SCR. Another variant of SCR is Selective Non-catalytic Reduction (SNCR), which can similarly use ammonia to reduce $NO_X$, albeit at a higher temperature.

The ammonia typically used in SCR and SNCR presents problems of its own, however. The most economical form of ammonia for use in SCR and SNCR is anhydrous ammonia, but classification of this reactant as a hazardous chemical may restrict its use in some locations. Aqueous ammonia is commonly used to avoid the hazardous chemical classification. But the costs of transportation, storage, and processing of aqueous ammonia are great, especially considering the fact that most of what is shipped, stored, and processed is the water, which can be in excess of about 70% by volume. This cost may restrict the use of aqueous ammonia.

In order to avoid the costs and hazards of transporting and storing anhydrous and aqueous ammonia, on-site production of ammonia is commonly used in conjunction with SCR and SNCR. Ammonia suitable for SCR and SNCR can be produced from urea, which is not hazardous and can be inexpensively transported in its solid form. Typically, a hydrolysis process within a saturated steam-water vessel is used to produce gaseous ammonia and other useful reactants from solid urea. It is also possible to generate ammonia and other useful reactants from urea by gasifying urea in a stream of combustion gases to decompose the urea into useful reactants, as described in U.S. Pat. No. 7,090,810 to Sun et al.

U.S. Pat. No. 6,730,280 to Cooper et al. describes a method for producing ammonia from solid urea. Solid urea is mixed with water into an aqueous solution. The aqueous urea is then processed in a pressurized reactor in which heat is applied to promote hydrolysis of the urea. Gaseous ammonia, carbon dioxide, and steam bubble out of the liquid in the bottom of the reactor. These gasses accumulate at the top of the reactor, and can then be introduced into flue gasses to reduce $NO_X$ emissions therefrom.

U.S. Pat. No. 5,252,308 to Young describes a method for producing ammonia from urea using an acid. An aqueous solution of urea is introduced into a reactor, which includes a vessel containing concentrated liquid phosphoric acid. Ammonia and carbon dioxide are liberated in a gaseous form within the reactor, and can then be introduced into flue gasses for $NO_X$ reduction.

U.S. Pat. No. 7,008,603 to Brooks et al. describes a process for converting urea to ammonia in an on demand basis. A control system is implemented to control the temperature and pressure of a pressurized reactor in such a manner as to release a desired amount of ammonia. Urea can be supplied to the reactor from solid urea mixed into an aqueous solution, or as molten urea. Heating coils can supply the needed heat to the liquid reactants in the reactor.

Such conventional methods and systems generally have been considered satisfactory for their intended purpose. However, the state of the art urea hydrolysis reactors have large pressure vessels holding standing liquid. Thus they take up valuable space and controlling their reaction rates can be difficult. Typical hydrolysis reactors are heavy and operate at high pressures, which raises safety concerns. Known hydrolysis reactors have significant reactant volumes, which can lead to complications during start up and shut down. Moreover, the bubbling of ammonia and other gases out of the liquid state of the known urea hydrolysis reactors can cause a foam layer to build up. This, along with the build up of additives commonly used in solid urea, can lead to an accumulation of contaminants within the reactor, requiring frequent down time for cleaning and maintenance of the reactor. Although solutions to some of these problem have been developed, such as the method for removing contaminants in reactors described in U.S. Pat. No. 6,511,644 to MacArthur et al., there still remains a continued need in the art for low maintenance reactor for producing ammonia from urea. There also remains a need in the art for a urea conversion reactor that is inexpensive and easy to make and use. The present invention provides a solution for these problems.

SUMMARY OF THE INVENTION

The purpose and advantages of the present invention will be set forth in and become apparent from the description that follows. Additional advantages of the invention will be realized and attained by the methods and systems particularly pointed out in the written description and claims hereof, as well as from the appended drawings.

To achieve these and other advantages and in accordance with the purpose of the invention, as embodied herein, the invention includes a system for converting urea into reactants for removing $NO_X$ from industrial emissions. The system also includes a urea inlet, a steam inlet, and a reactor in fluid communication with the urea inlet and the steam inlet. The reactor is configured and adapted to inject urea from the urea inlet into a steam flow from the steam inlet to convert the urea into at least one reactant for $NO_X$ reduction within a substantially gaseous mixture.

In accordance with a further aspect of the invention, the system can further include a urea source in fluid communication with the urea inlet. The system can also include a steam source in fluid communication with the urea inlet. The reactor can be configured and adapted to convert urea into at least one reactant for $NO_X$ reduction through a chemical process including hydrolysis and/or decomposition. The system can further comprise a catalyst for exposing reactants within the reactor to a catalyst to facilitate urea conversion within the reactor. A catalyst can be added to the urea in the urea source before injection.

In accordance with another aspect of the invention, the urea inlet can include a nozzle configured and adapted to inject urea into the reactor. The nozzle can be configured and adapted to atomize urea being injected into the reactor. The urea inlet can be configured and adapted to inject an aqueous solution of 1-75% urea into the reactor. The nozzle can be configured and adapted to atomize aqueous urea through mechanical-pressure loss. The nozzle can be configured and adapted to atomize urea with assistance from another fluid. Moreover, the nozzle can be configured and adapted to inject molten urea into the reactor.

In accordance with another aspect of the invention, the urea inlet can include a nozzle configured and adapted to inject urea droplets the range of about 30 microns to about 1000 microns in size. The reactor can include an internal flow passage of sufficient volume to provide residence time to convert substantially all of the urea from the substantially gaseous mixture flowing therethrough. It is also contemplated that the urea inlet can include a heat source for pre-heating urea prior to injection into the reactor.

In accordance with still another aspect of the invention, the reactor and steam inlet can be configured and adapted to supply a flow of superheated steam for converting urea in the reactor. The reactor can be configured and adapted to accommodate the substantially gaseous mixture at a temperature in excess of about 600° F. The reactor can also be configured and adapted to accommodate the substantially gaseous mixture at a temperature in excess of about 650° F. It is also contemplated that the reactor can be configured and adapted to accommodate the substantially gaseous mixture at a temperature in excess of about 1000° F. The range of temperatures of the substantially gaseous mixture of the reactor can be from about 500° F. to about 1600° F. Further, the reactor can be configured and adapted to accommodate the substantially gaseous mixture at a temperature in the range of about 1000° F. and about 1050° F.

In accordance with a further aspect of the invention, the reactor can be configured and adapted to receive saturated steam from the steam inlet. The reactor can include a heater configured and adapted to maintain at least a portion of the surface of the reactor at an elevated temperature to prevent condensation thereon. The reactor can include a first reducer upstream of the urea inlet configured and adapted to increase the cross-sectional area of a flow therethrough, and a second reducer downstream of the urea inlet configured and adapted to decrease the cross-sectional area of a flow therethrough.

The system can further include a first control loop operatively connected to the reactor to control urea injection rate based on demand for $NO_X$ reduction, a second control loop operatively connected to the reactor to control temperature of the substantially gaseous mixture upstream from the second reducer, and a third control loop operatively connected to the reactor to control temperature of the substantially gaseous mixture downstream from the second reducer.

It is also possible to practice the invention wherein the system includes a first control loop operatively connected to the reactor to control urea injection rate based on demand for $NO_X$ reduction, a second control loop operatively connected to the reactor to control the ratio of steam from the steam inlet to urea from the urea inlet, and a third control loop operatively connected to the reactor to control temperature of the substantially gaseous mixture downstream from the second reducer.

In further accordance with the invention, the system can include a once-through process that uses superheated steam to convert urea from a sub-cooled liquid to superheated ammonia gas. Carbon dioxide, water vapor, and some other gas constituents in smaller concentrations can also be present in the process gas.

The apparatus also includes a system in which urea is supplied from a urea supply into a urea line. The urea line passes through a heat exchanger at high temperature. Aqueous urea passing through the line is hydrolyzed in the heat exchanger. Vaporous ammonia and other reactants useful for $NO_X$ reduction are then separated out from the liquid mixture in a liquid/vapor separator. The useful vapors can then be injected into effluent gasses for $NO_X$ reduction. Liquid from the liquid/vapor separator can be cooled and returned to the urea source for reuse. It is also possible to use a catalyst in the urea source, which can be recycled through the liquid separator along with the other fluid.

The invention also includes a method for converting urea into reactants for reducing $NO_X$ out of industrial emissions. The method includes injecting urea into a steam flow to convert the urea into at least one reactant for $NO_X$ reduction within a substantially gaseous mixture. The step of injecting can include injecting urea into a steam flow to convert the urea into at least one reactant for $NO_X$ reduction within a substantially gaseous mixture. The method can further include a step of converting substantially all of the urea from the substantially gaseous mixture. It is also contemplated that the method can include a step of pre-heating the urea prior to injection into the reactor. The method can further include a step of heating a reactor containing the substantially gaseous mixture to maintain at least a portion of the surface of the reactor at an elevated temperature to prevent condensation thereon. A catalyst can be added to the urea before the step of injecting. Further, the method can include the step of exposing urea to a catalyst to facilitate urea conversion.

The method can further include a step of mixing solid urea with water to produce an aqueous solution of urea prior to the step of injecting. It is also contemplated that the method can include a step of heating solid urea to produce molten urea for injecting.

The step of injecting can also include converting urea through a chemical process including hydrolysis. It is also contemplated that the injecting step can include converting urea into reactants for $NO_X$ reduction through hydrolysis and decomposition. The injecting step can include atomizing urea through a nozzle. The flow of steam can be superheated steam.

In accordance with the invention, the substantially gaseous mixture in the injecting step can have a temperature in excess of about 600° F. It is also possible for the gaseous mixture to have a temperature in excess of about 650° F. Moreover, the gaseous mixture can have a temperature in excess of about 1000° F. The range of temperatures for the substantially gaseous mixture can be from about 500° F. to about 1600° F. It is also contemplated that the substantially gaseous mixture can have a temperature in the rage of about 1000° F. to about 1050° F.

In further accordance with the invention, the method can further include a step of controlling conversion of urea within the substantially gaseous mixture in a reactor. The controlling step can include controlling with a first control loop operatively connected to the reactor to control urea injection rate based on demand for $NO_X$ reduction. The controlling step can further include a second control loop operatively connected to the reactor to control temperature of the substantially gaseous mixture upstream from a reducer. Further, the controlling step can include a third control loop operatively connected to the reactor to control temperature of the substantially gaseous mixture downstream from the second reducer.

In further accordance with the invention, the method can further include a step of controlling conversion of urea within the substantially gaseous mixture in a reactor, including controlling with a first control loop and third control loop as described above, wherein the second control loop is operatively connected to the reactor to control the ratio of steam from the steam inlet to urea from the urea inlet.

It is to be understood that both the foregoing general description and the following detailed description are exemplary and are intended to provide further explanation of the invention claimed.

The accompanying drawings, which are incorporated in and constitute part of this specification, are included to illustrate and provide a further understanding of the method and system of the invention. Together with the description, the drawings serve to explain the principles of the invention.

DETAILED DESCRIPTION OF THE PREFERRED EMBODIMENT

Reference will now be made in detail to the present preferred embodiments of the invention, examples of which are illustrated in the accompanying drawings. The method and corresponding steps of the invention will be described in conjunction with the detailed description of the system.

The devices and methods presented herein may be used for converting urea into reactants such as ammonia that are suitable for use in $NO_X$ reduction processes. The present invention is particularly suited for converting urea to ammonia and other reactants for use in processes such as SCR and SNCR.

In accordance with the invention, a system for converting urea into reactants for removing $NO_X$ from industrial emissions is provided including a urea inlet, a steam inlet, and a reactor in fluid communication with the urea inlet and the steam inlet. The reactor is configured and adapted to inject urea from the urea inlet into a steam flow from the steam inlet to convert the urea into at least one reactant for $NO_X$ reduction within a substantially gaseous mixture.

Figure 1:
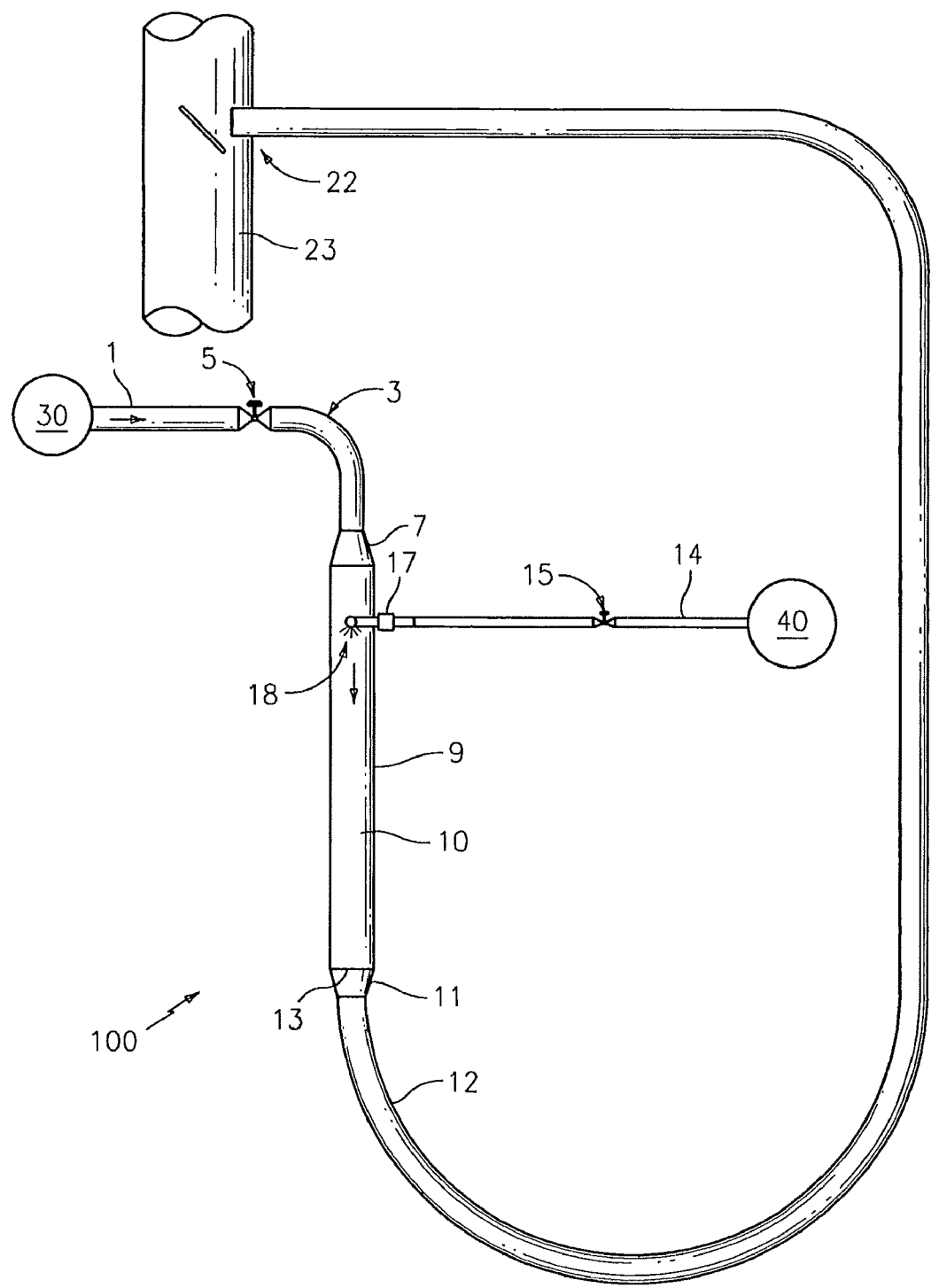
FIG. 1 is a schematic of a first representative embodiment of a system for converting urea in accordance with the present invention.

For purposes of explanation and illustration, and not limitation, a partial view of an exemplary embodiment of a system for converting urea in accordance with the invention is shown in FIG. 1 and is designated generally by reference character 100. Other embodiments of a system in accordance with the invention, or aspects thereof, are provided in FIGS. 2-3, as will be described.

In accordance with the invention, a reactor is provided in fluid communication with a urea inlet and a steam inlet. For purposes of illustration and not limitation, as embodied herein and as depicted in FIG. 1, system 100 is provided with a reactor chamber 9, which is in fluid communication with a steam inlet 3 and a urea inlet in the form of a nozzle 18.

Nozzle 18 is connected to a urea source 40 through urea source line 14. Nozzle 18 connects to reactor chamber 9 through a thermal sleeve attachment 17, as is known in the art. Urea control valve 15 in urea source line 14 allows for controlling the rate at which urea is injected through nozzle 18 into reactor chamber 9. Urea source 40 can supply nozzle 18 with an aqueous solution of urea created on site by mixing water with solid urea, as is known in the art. Optionally, a catalyst can be added to the urea to facilitate its eventual hydrolysis and/or decomposition. Nozzle 18 can atomize the urea injected by employing, for example, mechanical-pressure loss or assistance from another fluid. However, it is not a requirement for Nozzle 18 to atomize the urea. Typical concentrations for aqueous urea are about 1%-75% urea by weight. It is also possible for urea source 40 to supply urea in its molten form, as is known in the art. Those skilled in the art will appreciate that when urea is used in its molten form, conversion can take place primarily through thermal decomposition rather than through hydrolysis. Urea source 40 supplies urea under sufficient pressure to be dispersed by nozzle 18 as it is injected into reactor chamber 9. Moreover, it may be desirable to use multiple nozzles, such as for turn down.

Steam inlet 3 connects reactor 9 to a steam source 30 through steam inlet source line 1, which includes steam control valve 5 for controlling the rate of steam injection into reactor chamber 9. It is possible to supply steam from an existing source, such as in a power plant. Steam source 30 should supply steam that has a temperature in excess of about 600° F. in order to facilitate the reactions in converting urea. In power plants, for example, steam can typically be supplied from a first or second hot reheat stage at about 1000-1050° F. In other applications where there are no reheat steam cycles, steam can be supplied, for example, from a primary superheater or main steam outlet.

Those skilled in the art will readily appreciate that the steam supply will vary from application to application, and in some cases additional equipment may be used to produce desired conditions in steam source 30 without departing from the spirit and scope of the invention. It is possible to practice the invention with source steam at anywhere from about 500° F. to about 1600° F., the hotter temperatures being attainable, for example, by re-routing source steam back through a boiler for a second heating cycle.

Reactor chamber 9 can be made from a variety of materials, including corrosive resistant materials such as AISI 316L stainless steel, or other alloys as appropriate for higher temperature. However, those skilled in the art will readily appreciate that other suitable materials can also be used without departing from the spirit and scope of the invention.

In further accordance with the invention, system 100 is configured and adapted to inject urea from the urea inlet into a steam flow from the steam inlet to convert urea into at least one reactant for $NO_X$ reduction within a substantially gaseous mixture. The reactor of system 100 includes reactor chamber 9 and reactor line 12 connected to reactor chamber 9 through a second reducer 11, which cooperates with first reducer 7 to create a suitable volume for reactor chamber 9. The steam and urea injected into reactor chamber 9 can be converted into vapors of steam, carbon dioxide, ammonia, cyanuric acid, isocyanic acid (HNCO), and other reactants useful for $NO_X$ reduction through known chemical processes, such as hydrolysis and decomposition.

Known hydrolyzer processes convert urea to ammonia in a pressure vessel in which a saturated water level is maintained to facilitate the hydrolysis reaction. Vapors of ammonia, carbon dioxide, and water are extracted from above the liquid level for injection into effluent gasses. These vessels are designed to operate at low saturation pressure-temperatures (typically less than about 450 psig and 460° F.). Other known hydrolyzer processes are designed for various means of heating at higher temperatures to keep the urea and converted ammonia in liquid phase for injection into the effluent gas. These relatively low operating temperature conditions can require several minutes of residence time for conversion. Typical residence times for known hydrolyzer processes can range from 45 to 378 minutes. Typical residence times for known urea decomposition processes (e.g. U.S. Pat. No. 7,090,810 to Sun et al.) are on the order of 1 to 10 seconds.

The residence time for system 100 is much less than for known hydrolyzer systems because system 100 uses high temperature steam to heat and hydrolyze urea into useful reactants within a substantially gaseous mixture, as opposed to hydrolyzing in a standing liquid reservoir as in the art. The steam from steam supply 30 flows past nozzle 18, where droplets of urea are injected. The heat required for hydrolysis and/or decomposition of the urea is amply supplied by the high temperature steam flow as the urea and steam combine into a process mixture that flows through reactor chamber 9 and reactor line 12. When urea is supplied in an aqueous solution, hydrolysis occurs primarily within the droplets of aqueous urea as the droplets are swept through reactor chamber 9 and reactor line 12, the heat being supplied from steam outside the droplets. However thermal decomposition can also occur to generate useful reactants from the urea, especially as the liquid in the droplets is driven off. In the case of molten urea being supplied, reactants are produced primarily through thermal decomposition of the urea. A residence time of between about 0.1-40 seconds while the mixture flows to the end of reactor line 12 is typically sufficient under these high temperature/pressure conditions to convert substantially all of the urea into useful reactants.

The conversion of ammonia by hydrolysis in reactor chamber 9 and reactor line 12 is dependant on the pressure and temperature of the process mixture around point 10, as well as the droplet size of injected aqueous urea solution. Urea solution droplet size is controlled by injection nozzle 18, as is known in the art. If superheated steam is used, larger droplet sizes, in excess of about 500 microns, should be injected by nozzle 18 in order to provide adequate residence time to vaporize the droplets and thus affect a higher conversion rate of urea to ammonia by hydrolysis. The percent conversion of urea to ammonia and other useful reactants by decomposition is based on temperature and residence time. The process mixture around point 13 should have a temperature in excess of about 525° F. to ensure substantially all of the urea conversion is completed. System 100 can operate at pressures ranging from as low as about ±35 inches of water at duct 23 to pressures as high as about 500-1500 psig at first reducer 7.

Steam, carbon dioxide, ammonia, and other products of the urea conversion process eventually reach injection grids 22 in the end of reactor line 22, and are injected into a gas duct 23 for use in conversion of urea, where the products can be used for example in $NO_X$ reduction through SCR or SNCR.

The combined length of reactor chamber 9 and reactor line 12 is sufficient to convert substantially all of the urea into useful reactants. Those skilled in the art will readily appreciate that the length of reactor line 12 and volume of reactor 9 can be varied to provide adequate residence time for the chemical processes to convert substantially all of the urea, based on the other flow parameters described below. Flow rates within reactor line 12 should be maintained below the choke limit. Moreover, flow rates are governed by demand for $NO_X$ reduction. Preferably, the amount of steam extracted from other industrial processes is kept minimal in order to maintain thermal efficiency in said processes. System 100 can be modified or configured to supply as small a supply of ammonia as needed, there is no lower limit. On the other hand, those skilled the art will be able to practice the invention wherein system 100 can produce ammonia and other useful reactants at rates in excess of 5,000 $lb_m$/hour.

It is also possible to use a catalyst, as is known in the art, to facilitate hydrolysis and decomposition of urea in system 100. Such catalysts could be supplied within an aqueous urea solution injected into reactor chamber 9. It is also possible that a catalyst could be injected separate from the urea. Reactor chamber 9 could also be configured to include stationary catalysts for urea conversion, as is known in the art.

Figure 2:
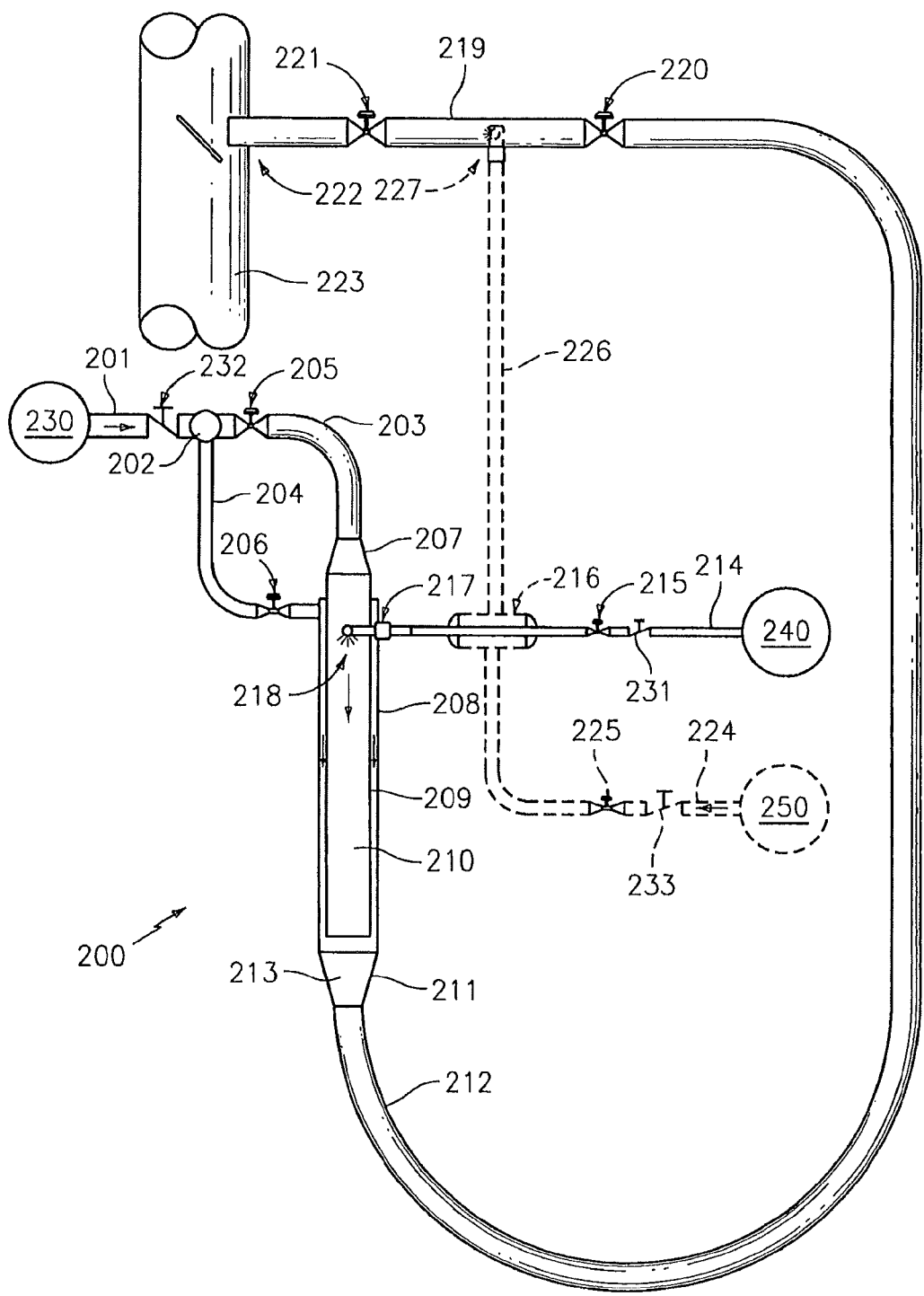
FIG. 2 is a schematic of a second representative embodiment of a system for converting urea in accordance with the present invention, showing heaters for the urea supply line and the reactor chamber.

With reference now to FIG. 2, one alternative embodiment of a system in accordance with the invention is shown. System 200 employs many of the same or similar elements as system 100, as described above. A steam source 230 supplies high temperature steam to reactor chamber 209 through control steam source line 201, control valve 205, and first reducer 207. Urea source 240 supplies urea through urea source line 214, urea control valve 215, and thermal sleeve attachment 217, as described above. Nozzle 218 injects urea into the flow of steam to create a process mixture 210, which enters second reducer 211 around point 213, and continues into reactor line 212 to eventually be injected into gas duct 223 through injection grids 222.

Additionally, system 200 provides means for heating the walls of reaction chamber 209. Steam from source 230 passes through a check valve 232 and a portion of the steam supply is diverted in manifold 202 through reactor heating line 204. Reactor heating line 204 includes a control valve 206 for controlling the amount of heating supplied to the walls of reactor chamber 209. Diverted steam then flows through jacket 208, which envelopes most of reactor chamber 209, and thereby supplies heat to the walls of reactor chamber 209. Diverted steam and process mixture 213 are mixed together in second reducer 211 to flow together into reactor line 212. Heating the walls of reactor chamber 209 can be particularly beneficial to keep reactor components hot and clean even if some urea impinges thereon.

System 200 also provides for preheating of urea, which can help, for example, help with alleviating thermal shocking at nozzle 18. Preheating urea also reduces the minimum required residence time. A secondary steam source 250 supplies steam through secondary steam source line 224, check valve 233, and control valve 225 to control the amount of heating supplied to urea heater 216. Check valves 231, 232, and 233 prevent backflows in their respective lines. Urea heater 216 envelops a portion of urea source line 214, allowing secondary steam to provide heat to urea flowing toward nozzle 218. Once used in heater 216, secondary steam travels through condensate line 226 to secondary steam nozzle 227, where it joins the mixture passing through segment 219 of reactor line 212. First and second pressure reducing stations 220 and 221 can regulate pressures to assure proper flow in lines 226 and 212, as is known in the art.

While system 200 has been shown having steam source 230 and secondary steam source 250, those skilled in the art will readily appreciate how to modify the system so that all of the steam is supplied from a single source, or so that reaction steam, heating steam in jacket 208, and heating steam in heater 216 are each supplied from three separate sources. It is also possible to heat reactor chamber 209 in two or more sections at different temperatures by including additional jackets (like jacket 208) with steam supplied at a different temperature from that supplied in line 204. Doing so can provide for additional control over heat transfer and thus over residence time required. Moreover, heater 216 and sleeve 208 (and the respective supporting components) are optional. One or the other, or both, can be eliminated without departing from the spirit and scope of the invention. Those skilled in the art will appreciate that there are a variety of different ways to heat urea source line 214 and reactor chamber 209 besides heater 216 and sleeve 208. Gas heaters, electrical heaters, chemical heaters, or any other suitable means of heating can also be used without departing from the spirit and scope of the invention. Moreover, those skilled in the art will further appreciate how to shield the components of heater 216, sleeve 208, and other components from cyclic thermal shocking damage, such as by including thermal liners where applicable.

System 200 can be controlled very simply by control loops as are known in the art. For example, a first control loop can be connected to valve 215 to control the rate at which urea is injected. A second control loop can be connected to valve 205 to control the temperature of the substantially gaseous mixture upstream from second reducer 211. A third control loop can be operatively connected to valve 206 to control the temperature of the substantially gaseous mixture downstream from second reducer 211. Alternatively, for example, one control loop could be operatively connected to both valves 205 and 215 to control the ratio of steam to urea in the substantially gaseous mixture. Further, it is also possible to practice the invention with multiple nozzles 218, or multiple systems 200 in parallel for turndown.

Figure 3:
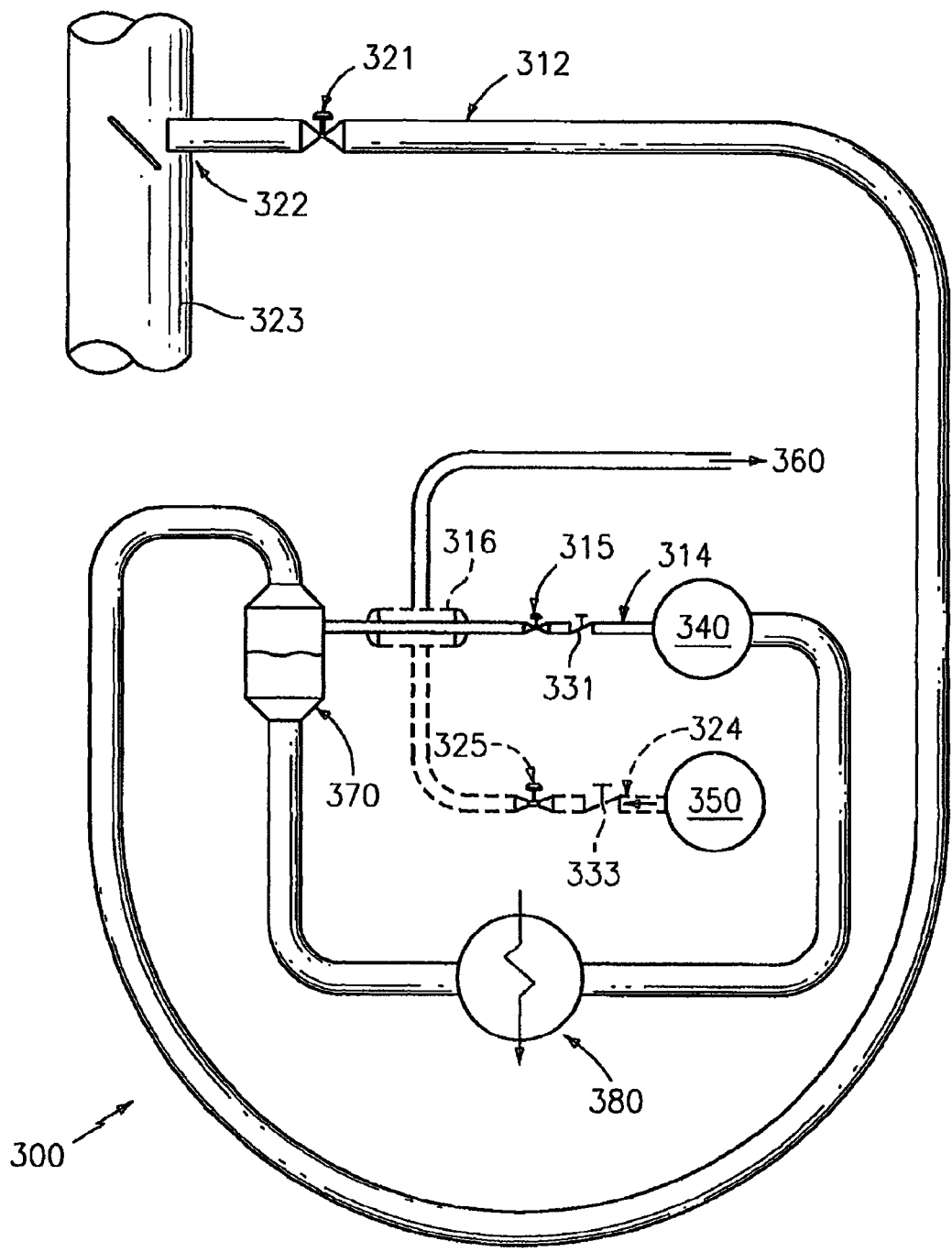
FIG. 3 is a schematic of a third representative embodiment of a system for converting urea in accordance with the present invention, showing a heater on the urea supply line and a liquid/vapor separator for separating useful hydrolyzed reactants from the liquid urea solution.

In accordance with another aspect of the invention, a system for converting urea into reactants for reducing $NO_X$ out of industrial emissions in provided, wherein hydrolysis takes place primarily in a urea supply line, and wherein the reactants are separated as vapor from a liquid/vapor separator and thereafter injected into effluent gasses. By way of example and not limitation, and as shown in FIG. 3, a system 300 is provided. System 300 includes a urea source 340, urea supply line 314 (with stop check valve 331 and control valve 315) and a steam source 350 (with steam line 324, stop check valve 333, and control valve 325), as described above in conjunction with system 200. Steam from steam source 350 supplies heat within heater 316 to urea supply line 314, much as described above with respect to system 200. Heater 316 can be a shell and tube heat exchanger or other suitable heater device, as are known in the art. Steam used in heater 316 can then be returned to a condensate return, as indicated by reference 360.

System 300 uses aqueous urea, which is heated by heater 316 as it flows through urea line 314. The heat from heater 316 supplies the heat energy for the endothermic hydrolysis reaction that converts the urea into ammonia and other reactants that are useful for $NO_X$ reduction, as described above. If urea is supplied at about 700 psig, and if heater 316 heats the urea to about 520° F., hydrolysis will occur in a residence time on the order of 1 second. After passing through heater 316, the mixture in urea line 314 passes into liquid/vapor separator 370. Liquid/vapor separator 370 separates vapors out of the mixture, which vapors include ammonia (and other $NO_X$ reducing reactants), carbon dioxide, and water vapor. The vapors are passed through reactant line 312 through control valve 321 and injection grid 322 where they are mixed with effluent gases in gas duct 323, as described above with reference to systems 100 and 200. Liquid separated in liquid/vapor separator 370 is passed through cooler 380 to condition it to be recycled back into urea source 340, as is known in the art. Cooler 380 is optional, but it can be advantageous if a catalyst is included in the mixture of urea source 340, to be recycled through cooler 380, for example.

System 300 can be practiced with control valve 315 located proximate to separator 370 (as opposed to the location shown in FIG. 3), in order to help maintain high pressure throughout the urea supply line. This can facilitate hydrolysis by keeping the urea in a liquid state until it reaches separator 370, at which point it can be flashed into steam in the separator 370. Separator 370 can have multiple inlet nozzles, and the nozzles can be of various orientations. It is advantageous to orient the nozzles downward at around 15-20° from horizontal to help prevent droplet carryover. It is also possible to use a separator that has internal structures to prevent carryover of droplets.

In accordance with another aspect of the invention, a method of for converting urea into reactants for reducing $NO_X$ out of industrial emissions is provided. The method includes injecting urea into a steam flow to convert the urea into at least one reactant for $NO_X$ reduction within a substantially gaseous mixture.

For purposes of illustration and not limitation, as embodied herein and as depicted in FIGS. 1-2, urea is injected into a flow of steam, for example in a reactor chamber (e.g. 9, 209) and/or reactor line (e.g. 12, 212). Heat from the steam facilitates chemical processes including hydrolysis and/or decomposition to convert the urea into reactants such as ammonia, cyanuric acid, isocyanic acid (HNCO), and other reactants useful for $NO_X$ reduction. The reactions take place as the urea is swept along the steam flow, therefore the reactions take place in a substantially gaseous mixture.

For purposes of illustration and not limitation, as embodied herein and as depicted, the injecting step can include converting urea into at least one reactant for $NO_X$ reduction through chemical processes including hydrolysis and decomposition, as described above with reference to systems 100, 200. The injecting step can further include atomizing urea through a nozzle (e.g. 18, 218) to facilitate the chemical reactions. The steam flow can be superheated. Preferably, substantially all of the urea is converted into useful reactants for $NO_X$ reduction processes like SCR and SNCR.

In further accordance with the method of the invention, it is also possible to include a step of pre-heating the urea prior to the step of injection. A pre-heater (e.g. 216) can perform the step of preheating, in accordance with the foregoing description of system 200. Moreover, it is also possible to include a step of heating the walls of a reactor (e.g. reactor chamber 209) to maintain a portion of the reactor walls at an elevated temperature to provide additional process heat and/or prevent condensation from forming inside the reactor. The temperature ranges for the substantially gaseous mixture can vary across a wide range, as described above with respect to system 100. However, the steam should be supplied at above about 500° F., as described above.

In further accordance with the invention, the method can further include the step of controlling conversion of urea within the substantially gaseous mixture in a reactor. The controlling can be accomplished through control loops connected to the reactor, as described above in connection with system 200.

The method can include the additional step of exposing urea to a catalyst to facilitate the conversion process. Such catalysts are known in the art and can generally be used to lower the operating temperatures or residence times required for urea conversion. A catalyst can optionally be added to the urea supply tank. If the catalyst is expensive or it cannot be discharged into the environment, the mixture containing the catalyst can be separated to recycle the catalyst back into the urea source, as is known in the art. The method can include mixing solid urea into an aqueous solution prior to being injected. It is also possible to include a step of heating solid urea to a molten state for injecting in accordance with the invention.

The methods and systems of the present invention, as described above and shown in the drawings, provide for a process for converting urea into ammonia and other reactants useful for $NO_X$ reduction. The methods and systems of the invention have superior properties including light-weight, compactness with a small footprint, a fast once-through process allowing for quick start up and shut down, increased safety due to lack of heavy pressure vessels, and inexpensive construction and operation due to use of components that are generally available as standard items. The invention also has advantages over known urea decomposition devises, such as that in U.S. Pat. No. 7,090,810 to Sun et al., in that the system of the invention is more energy efficient due to use of high temperature steam. The invention can also be smaller, simpler, and safer (since steam is used for heat rather than burners) than known urea decomposition systems. Moreover, the invention can produce more pure ammonia than in known urea decomposition systems, which can produce unknown byproducts when reacting urea with flue gasses. The unknown byproducts can cause problems, for example, with some catalysts used in SCR.

It will be apparent to those skilled in the art that various modifications and variations can be made in the device and method of the present invention without departing from the spirit or scope of the invention. Thus, it is intended that the present invention include modifications and variations that are within the scope of the appended claims and their equivalents.

What is claimed is:

1. A method for converting urea into reactants for reducing $NO_x$ out of industrial emissions, the method comprising injecting urea into a steam flow to convert the urea into at least one reactant for $NO_x$ reduction through hydrolysis inside droplets flowing within a substantially gaseous mixture.

2. A method for converting urea as recited in claim 1, wherein the step of injecting includes converting urea into at least one reactant for $NO_x$ reduction through a chemical process including hydrolysis and decomposition.

3. A method for converting urea as recited in claim 1, wherein the step of injecting includes atomizing urea through a nozzle.

4. A method for converting urea as recited in claim 1, wherein the flow of steam is superheated steam.

5. A method for converting urea as recited in claim 1, further comprising a step of converting substantially all of the urea from the substantially gaseous mixture.

6. A method for converting urea as recited in claim 1, further comprising a step of pre-heating the urea prior to injection into the reactor.

7. A method for converting urea as recited in claim 1, wherein the substantially gaseous mixture has a temperature in excess of about 600° F.

8. A method for converting urea as recited in claim 1, wherein the substantially gaseous mixture has a temperature in excess of about 650° F.

9. A method for converting urea as recited in claim 1, wherein the substantially gaseous mixture has a temperature in excess of about 1000° F.

10. A method for converting urea as recited in claim 1, wherein the substantially gaseous mixture has a temperature in the range of about 500° F. to about 1600° F.

11. A method for converting urea as recited in claim 1, wherein the substantially gaseous mixture has a temperature in the range of about 1000° F. to about 1050° F.

12. A method for converting urea as recited in claim 1, further comprising a step of heating a reactor containing the substantially gaseous mixture to maintain at least a portion of the surface of the reactor at an elevated temperature to prevent condensation thereon.

13. A method for converting urea as recited in claim 1, further comprising a step of controlling conversion of urea within the substantially gaseous mixture in a reactor including:
  a) a first control loop operatively connected to the reactor to control urea injection rate based on demand for $NO_x$ reduction;
  b) a second control loop operatively connected to the reactor to control temperature of the substantially gaseous mixture upstream from a reducer; and
  c) a third control loop operatively connected to the reactor to control temperature of the substantially gaseous mixture downstream from the reducer.

14. A method for converting urea as recited in claim 1, further comprising a step of controlling conversion of urea within the substantially gaseous mixture in a reactor including:
  a) a first control loop operatively connected to the reactor to control urea injection rate based on demand for $NO_x$ reduction;
  b) a second control loop operatively connected to the reactor to control the ratio of steam from the steam inlet to urea from the urea inlet; and
  c) a third control loop operatively connected to the reactor to control temperature of the substantially gaseous mixture downstream from a reducer.

15. A method for converting urea as recited in claim 1, further comprising a step of exposing urea to a catalyst to facilitate urea conversion.

16. A method for converting urea as recited in claim 15, wherein the step of exposing includes adding a catalyst to a urea source.

17. A method for converting urea as recited in claim 16, further comprising a step of recovering the catalyst after the step of exposing urea to the catalyst to preserve the catalyst for reuse.

18. A method for converting urea as recited in claim 1, further comprising a step of mixing solid urea with water to produce an aqueous solution of urea prior to the step of injecting.

19. A method for converting urea as recited in claim 1, further comprising a step of heating solid urea to produce molten urea for injecting.

* * * * *